United States Patent [19]

Ohta et al.

[11] Patent Number: 4,578,314

[45] Date of Patent: Mar. 25, 1986

[54] MAGNETIC RECORDING MEDIUM AND METHOD FOR MANUFACTURE THEREOF

[75] Inventors: Hiroshi Ohta, Komoro; Shinji Abe; Kiyoto Fukushima, both of Saku, all of Japan

[73] Assignee: TDK Corporation, Japan

[21] Appl. No.: 651,219

[22] Filed: Sep. 17, 1984

[30] Foreign Application Priority Data

Sep. 16, 1983 [JP] Japan .................. 58-169290

[51] Int. Cl.$^4$ .................................................. G11B 5/70
[52] U.S. Cl. .............................. 428/403; 252/62.54; 360/134; 360/135; 360/136; 427/128; 427/248.1; 427/255.1; 427/255.6; 428/404; 428/405; 428/406; 428/694; 428/900
[58] Field of Search ............. 428/403, 405, 407, 694, 428/900, 328, 329, 695, 406, 404; 427/128, 131, 248.1, 255.1, 255.6; 360/134–136; 252/62.54

[56] References Cited

U.S. PATENT DOCUMENTS

| | | | |
|---|---|---|---|
| 4,091,164 | 5/1978 | Schwarz | 428/403 |
| 4,320,159 | 2/1980 | Ogawa | 428/694 |
| 4,330,600 | 5/1982 | Kawasumi | 428/694 |
| 4,379,809 | 4/1983 | Matsufuji | 428/470 |

FOREIGN PATENT DOCUMENTS 271250  1/1966  Australia .................. 428/403

Primary Examiner—Ellis P. Robinson
Attorney, Agent, or Firm—Wyatt, Gerber Shoup, Scobey and Badie

[57] ABSTRACT

A magnetic recording medium having deposited on the surface of a non-magnetic substrate a magnetic layer formed by dispersing a powdered magnetic substance and a powdered abrasive in a binder, which magnetic recording medium is characterized by having abrasive particles activated on the surface thereof.

14 Claims, 1 Drawing Figure

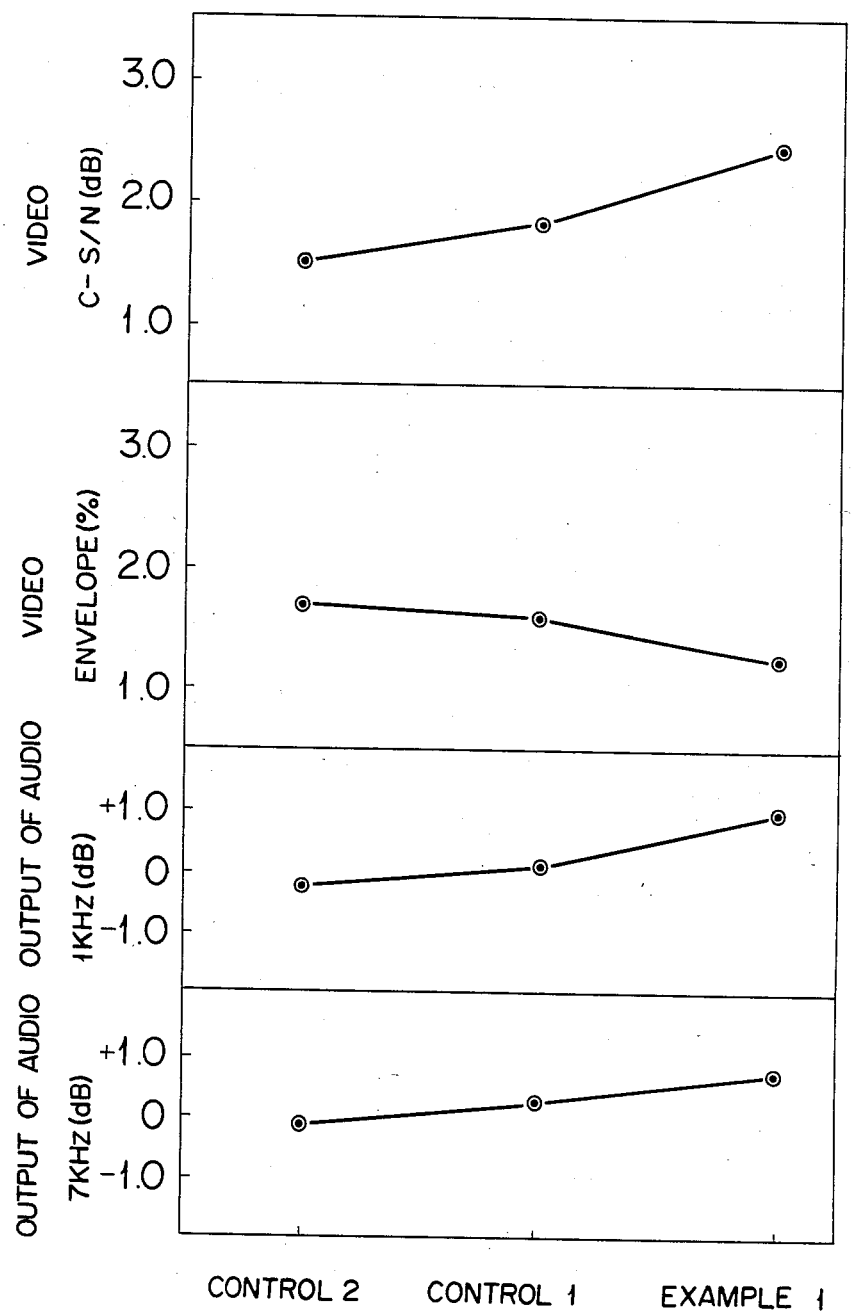

MAGNETIC RECORDING MEDIUM AND METHOD FOR MANUFACTURE THEREOF

BACKGROUND OF THE INVENTION

1. Field of the Invention

This invention relates to a magnetic recording medium and to a method for the manufacture thereof. More particularly, this invention relates to a magnetic recording medium such as for video tape, audio tape and magnetic disc which is improved by the inclusion of abrasive in the magnetic layer thereof or to a method for a manufacture thereof. More specifically, this invention relates to a magnetic recording medium having various properties enhanced by improving dispersibility of abrasive in the magnetic layer and to a method for the manufacture thereof.

2. Description of Prior Art

Heretofore it has been customary to produce the magnetic recording medium such as a magnetic tape by the steps of thoroughly mixing acicular-shaped or granular magnetic metal particles, additives such as abrasive, and a binder in a ball mill, applying the resultant mixture on a substrate film such as polyester film, and drying the composite film thereby forming a magnetic layer on the substrate film.

In recent years, the recording density of the magnetic recording medium has steadily increased. This trend has necessitated development of a magnetic recording medium having improved S/N ratio and enhanced surface property. Various suggestions have been made with a view to fulfilling the requirement. One of them resorts to addition of a dispersant for improving the dispersibility of magnetic powder and other additives in the binder. Conventionally, however, the addition of the dispersant has been effected by simply adding the dispersant to a mixture of magnetic powder, additives and binder and stirring the resultant mixture. If the dispersant is added by this method, however, the improvement of dispersibility sought by the addition of the dispersant is not fully attained because of the difficulty of dispersion of solid particles in the mixture. Thus, this method has attained the improvement in the S/N ratio, for example, only to a nominal extent.

An object of this invention, therefore, is to provide an improved magnetic recording medium and a method for the manufacture thereof.

Another object of this invention is to provide a magnetic recording medium having various properties enhanced by the improvement of dispersibility of abrasive in the magnetic layer thereof and a method for the manufacture thereof.

SUMMARY OF THE INVENTION

The objects described above accomplished by the improvement in a magnetic recording medium having deposited on the surface of a non-magnetic substrate a magnetic layer formed by dispersing a powdered magnetic substance and a powdered abrasive in a binder, which improvement comprises the aforementioned abrasive particles being activated on the surface thereof.

The objects are further accomplished by a method for the manufacture of a magnetic recording medium by the steps of dispersing a powdered magnetic substance and a powdered abrasive in a binder and forming a layer of the resultant magnetic mixture on the surface of a non-magnetic substrate, which method comprises dissolving a surface active agent in a solvent, vaporizing the resultant solution, exposing the aforementioned powdered abrasive to the resultant vapor thereby obtaining a surface activated abrasive, mixing the abrasive with the powdered magnetic substance and the binder, and applying the resultant mixture on the surface of the non-magnetic substrate.

In accordance with the present invention, therefore, highly advantageous dispersions of the powdered abrasive can be attained by causing adsorption of a surface active agent in advance on the powdered abrasive and mixing the resultant surface activated abrasive with the powdered magnetic substance and the binder.

BRIEF DESCRIPTION OF THE DRAWING

The drawing represents a graph showing the electromagnetic alteration property of magnetic recording media obtained in a working example of this invention and controls.

EXPLANATION OF PREFERRED EMBODIMENT

The powdered abrasive to be used in the present invention is a non-magnetic solid powder having an average particle diameter of 0.01 to 10 $\mu$m, preferably 0.01 to 1 $\mu$m. Examples of this power include alumina, silica, titanium dioxide, titanium nitride, silicon nitride, chromium nitride, goethite, graphite, cerium polishing power, zeolite, hematite, chromium oxide and carbon black in a finely divided form. Preferred among other examples are alumina, titanium dioxide, titanium nitride, chromium nitride and chromium oxide.

The surface activated abrasive in the present invention is obtained by causing the powdered abrasive to adsorb a surface active agent thereon. Specifically, it is produced by the following method. First, the abrasive is fed to a furnace so as to be given the largest exposed surface. Then, a surface active agent is dissolved in a solvent to produce a surface active agent solution, the solution is fed to a vessel provided with a gas inlet tube and a theremometer, and this vessel is connected to the aforementioned furnace. The surface active agent solution is vaporized by application of heat under an atmosphere of inert gas. The produced vapor is fed as entrained by the inert gas into the aforementioned furnace and brought into contact with the abrasive. In this case, the solution of the surface active agent may be otherwise vaporized by plunging a gas tube into the solution, and blowing the inert gas into the solution and bubbling the solution thereby enabling the vapor of the solution to be entrained by the rising inert gas instead of heating the solution. In the aforementioned method, the temperature of the solution and the furnace may be at any level below the decomposition temperature of the surface active agent, generally in the range of 10° to 400° C., preferably 20° to 300° C. To facilitate the adsorption of the surface active agent to the abrasive, the abrasive is desired to be heated in advance. This adsorption proceeds more readily in proportion as the preheating temperature of the abrasive is increased. The preheating temperature falls generally in the range of 10° to 700° C., preferably 200° to 500° C. The furance to be used herein may be a stationary furnace, a rotary kiln or a fluidized-bed furnace.

The surface active agent to be used herein may be anionic surface active agent, nonionic surface active agent, cationic surface acitve agent or amphoteric surface active agent.

Examples of the anionic surface active agents which are advantageously used in this invention include those of straight-chain alkylbenzene sodium sulfonate type

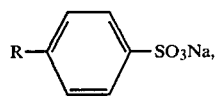

alcohol-sulfate type R—OSO$_2$Na, polyoxy-ethylenealkyl ether sulfate type R—O—CH$_2$CH$_2$—O)$_n$SO$_3$Na polyoxy-ethylene-alkylphenyl ether sulfate type

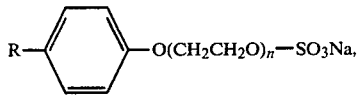

alkylmethyl tauride type

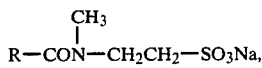

α-olefin sulfonate type RCH=CH(CH$_2$)$_n$SO$_3$Na, dialkyl sulfosuccinate type

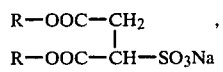

polyoxyethylene carboxylic ester sulfate type R—COO—(CH$_2$CH$_2$O)$_n$SO$_3$Na, polyoxyethylene carboxylic ester phosphate type

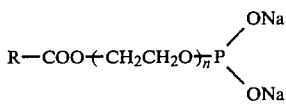

and β-naphthalene sulfonic acid-formaldehyde polycondensate type

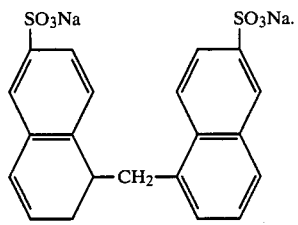

Examples of the nonionic surface active agents which are advantageously used herein include those of polyoxyethylene alkyl ether type R—O—(CH$_2$CH$_2$O)$_n$H, polyoxyethylene alkylaryl ether type

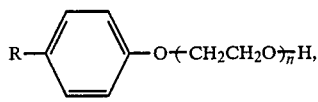

polyoxyethylene alkyl amine type R—NH—CH$_2$CH$_2$O)$_n$H and

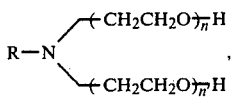

polyoxyethylene alkyl amide type R—CONH(CH$_2$CH$_2$O)$_n$H and

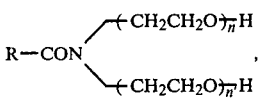

polyoxyethylene sorbitan fatty ester type

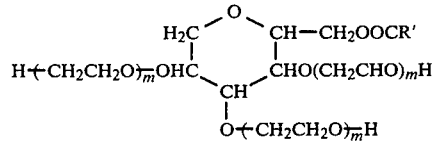

wherein, R' represents an alkyl having 6 to 25 carbon atoms and m an integer having the value of 5 to 50), Pluronic type HO—(CH$_2$CH$_2$O)$_a$(CH$_3$CHCH$_2$O)$_b$(CH$_2$CH$_2$O)$_c$H (wherein, a, b and c each have a vlaue greater than 1 and the sum of a, b and c has a value of 20 to 300), the Tetronic type

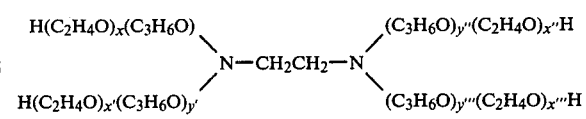

(wherein, X through X''' each have a value greater than 1, y through Y''' each have a value greater than 1 and the sum of X, X', X'', X''', Y, Y', Y'' and Y''' has a value of 20 to 600).

Examples of the cationic surface active agents which are advantageously used herein include those of primary amine salt R—NH$_2$.HCl, secondary amine salt

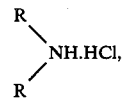

tertiary amine salt

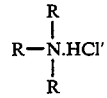

imidazole salt

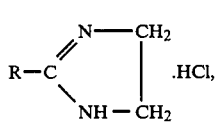

and alkyl quaternary ammonium salt

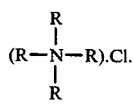

Examples of amphoteric surface active agents which are advantageously used herein include those of betaine type

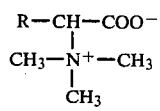

such as lauryl betaine and stearyl betaine, glycine type R—NH—CH$_2$—COOH, alanine type R—NH—CH$_2$—CH$_2$—OOH such as lauryl alanine and sulfobetaine type R$_1$—NH—R$_2$—SO$_3$H. It is provided that in the general formulas given above, R and R$_1$ each represent an alkyl group having 6 to 25 carbon atoms, R$_2$ an alkylene group having 1 to 5 carbon atoms, and n and n' each represent an integer having the value of 2 to 50, preferably 5 to 30.

Any one member of a desired combination of two or more members selected from the surface active agents enumerated above may be used. Among other types of surface active agents, nonionic surface active agents are used preferred and polyoxyethylene sorbitan fatty acid ester type surface active agents are used particularly preferred.

The solvent to be used in dissolving the surface active agent may be a polar solvent or nonpolar solvent. Examples of the solvent thus usable include alcohols such as methanol, ethanol, isopropanol and butanol; ketones such as acetone, methylethyl ketone; ethylisobutyl ketone, cyclohexane and dioxane; aromatic hydrocarbons such as benzene, toluene, xylene and pseudo-cumene; aliphatic hydrocarbons such as octane, decane and kerosene, alicyclic hydrocarbons such as cyclohexane; and hydroxy-aromatic hydrocarbons such as phenol. The aforementioned surface active agent is dissolved in the solvent in a concentration of 0.1 to 70% by weight, preferably 0.5 to 50% by weight.

As the gas to be introduced into the solution of the surface active agent or to be used for entraining the gas produced from the solution, an inert gas such as nitrogen, helium or argon is advantageously used.

The adsorption of the surface active agent to the abrasive can be confirmed by the CHN analysis method, the DSC method, the extraction method or other similar method.

The amount of the surface active agent to be adsorbed is 0.5 to 30% by weight, preferably 0.5 to 10% by weight, based on the magnetic powder.

The abrasive surface activated by the method described above is uniformly dispersed in conjunction with the magnetic powder in the binder solution. The amount of the surface activated abrasive thus added is in the range of 0.1 to 40 parts by weight, preferably 0.5 to 30 parts by weight, based on 100 parts by weight of the solids of the binder.

Examples of the powdered magnetic substance include $\gamma$-Fe$_2$O$_3$·Fe$_3$O$_4$, Co-doped $\gamma$-Fe$_2$O$_3$, Co-doped $\gamma$-Fe$_2$O$_3$·Fe$_3$O$_4$ solid solution CrO$_2$, $\gamma$-Fe$_2$O$_3$ of the coated with a Co type compound, Fe$_3$O$_4$ of the type coated with a Co type compound (including intermediate oxides with $\gamma$-Fe$_2$O$_3$; wherein the term "Co type ompound" means a cobalt compound such as cobalt oxide, cobalt hydroxide, cobalt ferrite or cobalt ion adsorbate which utilizes the magnetic anisotropy of cobalt for the enhancement of coercive force), and magnetic substances containing preponderantly ferromagnetic metal elements such as Co, Fe-Co, Fe-Co-Ni and Co-Ni, which are invariably in a finely divided state. The powdered magnetic substance may be prepared by the wet reduction method which involves use of a reducing agent such as NaBH$_4$, by the dry reduction method which involves treating the surface of iron oxide with a Si compound and then reducing the treated surface with hydrogen gas, or by the method which involves vacuum evaporation in a current of low-pressure argon gas, for example. Finely divided single-crystal barium ferrite particles are also usable.

The aforementioned finely divided magnetic powder may be in the form of acicular-shaped particles or granular particles, depending on the type of use for which the produced magnetic recording medium is intended. The acicular-shaped particles are desired to have an average major axis of 0.1 to 1 $\mu$m and an average minor axis of 0.02 to 0.1 $\mu$m. The granular particles are desired to have an average particle diameter of 0.01 to 0.5 $\mu$m. The finely divided magnetic substance is incorporated in the composition in an amount of 250 to 600% by weight, preferably 300 to 500% by weight, based on the total amount of the aforementioned resin.

Any of the binder resins generally accepted for the production of mangetic recording medium can be used herein. Typical examples of the binder resin include vinyl chloride type copolymers such as vinyl chloride-vinyl acetate copolymer, vinyl chloride-vinyl acetate-vinyl alcohol copolymer, vinyl chloride-vinyl alcohol copolymer and vinyl chloride-vinyl acetate-vinyl maleic acid copolymer; polyvinyl alcohol type resins such as saturated polyester resin, polyvinyl alcohol butyral resin, acetal resin, and formal resin; epoxy resin, phenoxy resin, and cellulose derivatives. Optionally, polyurethane and polyisocyanate are also incorporated.

The aforementioned resin composition and the magnetic powder are thoroughly kneaded in the selected mixing device such as, for example, ball mill, sand grind mill, roll mill, high-speed impeller dispersing device, homogenizer or ultrasonic dispersing device to produce a magnetic coating material. This magnetic coating material is applied by an ordinary method on a nonmagnetic substrate such as, for example, polyethylene terephthalate film, polyimide film or polyamideimide film. Among other films, the polyethylene terephthalate film proves particularly advantageous for this purpose. The thickness of the coating material thus applied on the substrate is generally 0.5 to 20 $\mu$m, preferably 0.5 to 10 $\mu$m, on dry basis.

The magnetic recording medium of the present invention which is obtained by the method described above has the magnetic powder and the additives uniformly dispersed therein and, consequently, possesses outstanding electromagnetic alteration property.

Now, the present invention will be described more specifically below with reference to the working examples. Wherever parts and precents (%) are mentioned, they are meant as parts and percents by weight unless otherwise specified.

| Composition A | |
|---|---|
| Component | Parts |
| Powdered γ-Fe$_2$O$_3$ doped with cobalt (major axis 0.4 μm, minor axis 0.05 μm, Hc 600 Oe) | 100 |
| Vinyl chloride-vinyl acetate copolymer | 20 |
| Polyester resin | 13 |
| Lubricant (silicone oil) | 5 |
| Methylethyl ketone | 100 |
| Methylisobutyl ketone | 100 |
| Cyclohexanone | 100 |

EXAMPLE 1

In a batch type rotary kiln, powdered alumina (average particle diameter 0.5 μm) was heated as spread out as widely as possible. A vessel provided with a thermometer and a gas inlet tube and adapted to be connected with the rotary kiln was charged with methylethyl ketone containing 5% sorbitan trioleate (a nonionic surface active agent produced by Kao Atlas Co. and marketed under trademark designation of Span 85) dissolved therein and then connected to the rotary kiln. The methylethyl ketone solution was heated at 130° C. under and atmosphere of nitrogen and the gas generated from the solution was forwarded as entrained by the current of nitrogen gas into the rotary kiln. In this case, the inner temperature of the rotary kiln was 80° C. With the rotary kiln kept at this temperature, the kiln interior was heated for one hour.

The heating was stopped, the kiln was cooled, and then the alumina powder was withdrawn from the kiln. The treated alumina powder, on CHN analysis, was found to have 20% by weight of sorbitan trioleate adsorbed thereon.

In a ball mill, 6 parts of the surface activated alumina powder (namely, 5 parts of alumina powder + 1 part of adsorbed sorbitan trioleate) and composition A were thoroughly mixed. The resultant mixture was further mixed thoroughly with 6 parts of polyfunctional aromatic isocyanate (produced by Nippon Polyurethane Industry Co. and marketed under trademark designation of Coronate L). The mixture thus obtained was applied in a thickness of 6 μm, on dry basis, on a substrate of polyester 12 μm in thickness, with the surface of the formed layer subjected to a finishing treatment. The film thus coated with the magnetic layer was thermally set at 60° C. for 48 hours and cut to produce magnetic tapes.

The magnetic tape was tested for color S/N ratio (dB), envelop (%), and audio property (dB). The audio property was measured with two frequencies, 1 KHz and 7 KHz.

The results were as shown in the drawing.

CONTROL 1

A magnetic tape was produced by following the procedure of Example 1, except that 5 parts of alumina and 1 part of sorbitan trioleate (nonionic surface active agent produced by Kao Atlas Co. and marketed under trademark designation of Span 85) were used by direct addition to Composition A.

The magnetic tape was tested as in Example 1.
The results are shown in the same drawing.

CONTROL 2

A magnetic tape was obtained by following the procedure of Example 1, except that 5 parts of alumina were used by direct addition to Composition A.

The magnetic tape was tested similarly to Example 1. The results are shown in the drawing.

It is noted from the drawing that when the surface active agent was added by the conventional method, the electromagnetic alteration property was higher than when no surface active agent was added but that the extent of this improvement was very slight.

It is further noted that the magnetic recording medium of this invention, though obtained from the same amounts of raw materials, showed notably higher electromagnetic alteration property. When this invention is only required to achieve the same degree of effect as the conventional method, it will permit a notable reduction in the amount of the surface active agent to be used.

What is claimed is:

1. A magnetic recording medium having deposited on the surface of a non-magnetic substrate a magnetic layer formed by dispersing a powdered magnetic substance and a powdered abrasive in a binder, which magnetic recording medium is characterized by having abrasive particles activated on the surface thereof by adsorption of from 0.5% to 30% by weight based on said abrasive of a surface active agent by contacting the particles with the vapors of a solution containing the surface active agent in a solvent.

2. A magnetic recording medium according to claim 1, wherein said surface active agent is at least one member selected from the group consisting of cationic, anionic amphoteric and nonionic surface active agents.

3. A magnetic recording medium according to claim 2, wherein said surface active agent is a nonionic surface active agent.

4. A magnetic recording medium according to claim 1, wherein said surface activated abrasive particles have a surface active agent adsorbed thereon in an amount of 0.5 to 10% by weight based on said abrasive.

5. A magnetic recording medium according to claim 1, wherein said abrasive is at least one member selected from the group consisting of alumina, titanium dioxide, titanium nitride, chromium nitride and chromium oxide.

6. A method for the manufacture of a magnetic recording medium having deposited on the surface of a non-magnetic substrate a magnetic layer formed by dispersing a powdered magnetic substance and a powdered abrasive in a binder, which method comprises dissolving a surface active agent in a solvent, vaporizing the resultant solution, bringing the produced gas into contact with said powdered abrasive thereby producing a surface activated abrasive haing adsorbed on its surface from 0.5% to 30% by weight based on said abrasive of the surface active agent, mixing said abrasive with said powdered magnetic substance and said binder and applying the resultant mixture on the surface of said non-magnetic substrate.

7. A method according to claim 6, wherein said solvent is a polar solvent or a non-polar solvent.

8. A method according to claim 6, wherein said vaporization of said surface active agent solution is carried out in the presence of an atomsphere of inert gas.

9. A method according to claim 8, wherein said vaporization of said surface active agent solution is effected by application of heat to said solution.

10. A method according to claim 8, wherein said vaporization of said surface active agent solution is effected by introducing an inert gas into said surface active agent solution thereby bubbling said solution and causing said solution to be entrained by departing inert gas.

11. A method according to claim 6, wherein said abrasive is heated in advance of said contact between said abrasive and said gaseous surface active agent.

12. A method according to claim 11, wherein the preheating temperature of said abrasive is in the range of 10° to 700° C.

13. A method according to claim 6, wherein said surface activated abrasive has said surface active agent adsorbed thereof in an amount of 0.5 to 10% by weight based on said abrasive.

14. A method according to claim 6, wherein said surface active agent is a nonionic surface active agent.

* * * * *